United States Patent
Haverlag et al.

(10) Patent No.: US 10,448,488 B2
(45) Date of Patent: Oct. 15, 2019

(54) LIGHTING CONTROL MODULE, A LIGHTING SYSTEM USING THE SAME AND A METHOD OF SETTING A DIMMING LEVEL

(71) Applicant: PHILIPS LIGHTING HOLDING B.V., Eindhoven (NL)

(72) Inventors: Marco Haverlag, Mierlo (NL); Peter Alexander Duine, Eindhoven (NL); Ralph Antonius Cornelis Braspenning, Zundert (NL); Marcel Beij, Sint Oedenrode (NL); René Van Honschooten, Nuenen (NL); Peter Deixler, Valdenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/569,944

(22) PCT Filed: Apr. 12, 2016

(86) PCT No.: PCT/EP2016/057975
§ 371 (c)(1),
(2) Date: Oct. 27, 2017

(87) PCT Pub. No.: WO2016/173832
PCT Pub. Date: Nov. 3, 2016

(65) Prior Publication Data
US 2018/0160511 A1    Jun. 7, 2018

(30) Foreign Application Priority Data

Apr. 27, 2015 (EP) ..................... 15165255

(51) Int. Cl.
*H05B 37/02* (2006.01)
*H05B 33/08* (2006.01)

(52) U.S. Cl.
CPC ..... *H05B 37/0272* (2013.01); *H05B 33/0854* (2013.01); *H05B 37/0218* (2013.01); *H05B 37/0254* (2013.01); *Y02B 20/46* (2013.01)

(58) Field of Classification Search
None
See application file for complete search history.

(56) References Cited

U.S. PATENT DOCUMENTS 8,072,164 B2 * 12/2011 Ilyes .................. H05B 37/0254
                                                    315/307
9,326,345 B2 *  4/2016 Brandsma .......... H05B 37/0218
(Continued)

FOREIGN PATENT DOCUMENTS

DE       19757295 A1      9/1998
EP        2852254 A1 *    3/2015    ......... H05B 33/0809
(Continued)

*Primary Examiner* — Dion Ferguson
*Assistant Examiner* — Srinivas Sathiraju
(74) *Attorney, Agent, or Firm* — Meenakshy Chakravorty (57) ABSTRACT

A lighting control module comprises an interface for receiving a dimming setting and a memory for storing the dimming setting. Based on the dimming setting, an output circuit generates a dimming control signal for application to a conventional dimming interface of a lighting driver circuit. For this purpose, power is received from the dimming interface. This provides a simple to use way to implement a controllable brightness, which makes use of a dimming driver but used for a luminaire which does not need to be within a networked dimmable system architecture.

15 Claims, 5 Drawing Sheets

(56) References Cited

U.S. PATENT DOCUMENTS

| | | | |
|---|---|---|---|
| 9,453,615 B2* | 9/2016 | Chen | F21K 9/278 |
| 9,509,402 B2* | 11/2016 | Ryan | H04B 10/116 |
| 9,648,697 B1* | 5/2017 | Hick | H05B 37/0272 |
| 9,848,480 B1* | 12/2017 | Roosli | H05B 37/0272 |
| 9,974,147 B1* | 5/2018 | Davis | H05B 37/0272 |
| 9,997,070 B1* | 6/2018 | Komanduri | G08G 1/142 |
| 10,019,047 B2* | 7/2018 | Bull | H04L 12/12 |
| 10,076,009 B2* | 9/2018 | Creusen | H05B 37/0227 |
| 2002/0014856 A1* | 2/2002 | Buij | H05B 41/2828 |
| | | | 315/209 R |
| 2005/0152439 A1* | 7/2005 | Beij | H05B 37/0254 |
| | | | 375/220 |
| 2007/0183133 A1* | 8/2007 | Buij | H04B 3/54 |
| | | | 362/85 |
| 2009/0167204 A1* | 7/2009 | Beij | H05B 41/3921 |
| | | | 315/291 |
| 2010/0102747 A1 | 4/2010 | Ilyes | |
| 2012/0299510 A1* | 11/2012 | Schenk | H05B 37/029 |
| | | | 315/294 |
| 2014/0001962 A1* | 1/2014 | Harris | H05B 33/0842 |
| | | | 315/153 |
| 2015/0008829 A1* | 1/2015 | Lurie | H05B 37/0245 |
| | | | 315/153 |
| 2016/0212806 A1* | 7/2016 | Malyna | H05B 33/0845 |

FOREIGN PATENT DOCUMENTS

| | | | | |
|---|---|---|---|---|
| WO | 2011120190 A1 | 10/2011 | | |
| WO | 2012021060 A2 | 2/2012 | | |
| WO | WO 2012021660 A1 * | 2/2012 | | G06Q 10/0631 |
| WO | 2012176097 A1 | 12/2012 | | |
| WO | WO 2012176097 A1 * | 12/2012 | | H05B 37/0245 |
| WO | WO 2013109261 A1 * | 7/2013 | | H04N 5/2353 |
| WO | 2013186670 A2 | 12/2013 | | |
| WO | WO 2014154274 A1 * | 10/2014 | | H05B 41/2981 |

* cited by examiner

LIGHTING CONTROL MODULE, A LIGHTING SYSTEM USING THE SAME AND A METHOD OF SETTING A DIMMING LEVEL

CROSS-REFERENCE TO PRIOR APPLICATIONS

This application is the U.S. National Phase application under 35 U.S.C. § 371 of International Application No. PCT/EP2016/057975, filed on Apr. 12, 2016, which claims the benefit of European Patent Application No. 15165255.9, filed on Apr. 27, 2015. These applications are hereby incorporated by reference herein.

FIELD OF THE INVENTION

This invention relates to the control of a lighting unit.

BACKGROUND OF THE INVENTION

LED lighting is transforming the lighting industry, such that light products are no longer merely on/off devices, but have become sophisticated devices with more elaborate control options, made possible by the easy controllability of LEDs.

Some installations make use of networked dimmable luminaires. However, this requires a more involved wiring infrastructure.

There are therefore also many installations where fixed light output luminaires are fitted.

When a customer uses lighting modules to build luminaires, there is often a need to optimize the luminaire to their preference, without being restricted to a fixed light output, temperature or power. For instance, an optical design may require less light output from the module.

At present, many different types of LED luminaire are offered, via the trade channel, for installation in lighting projects. Different luminaires are set with different light outputs so that the installer can select the desired lighting effect, by ordering a required selection of different luminaires.

This means that the wholesale company and/or installer often must keep several types of more or less the same luminaires in stock in order to enable the desired amount of light to be output in every situation. This is undesired from a logistical point of view and leads to a larger total number of products that must be kept in stock in order to guarantee an orderly flow of products.

It has been recognized that it would be desirable for the customer (i.e. the installer) to be able to flexibly set the output current for non-dimmable installations. The problem needs to be overcome that luminaires with a fixed output cannot easily be adapted to a different (lower) light output setting when this is desired.

Current fixed output LED drivers can be configured to lower the output current (and therefore reduce the light flux from the luminaire) by making changes to the hardware. For example, the customer can apply a suitable current setting resistor to the driver. The driver then uses this component to define the output current. This requires skilled personnel and often extra time during installation.

An alternative to placing a current setting resistor in the driver is to have a remotely settable drive current, which involves wireless communication with the driver to program the driver. The drive current is then set by the driver and no additional components in the lighting module are required.

The disadvantage of this approach is that the portfolio of drivers needs to be upgraded. This portfolio consists of many driver types (fixed output, dimming, DALI dimming, different housings, different power).

This means the implementation of the improved system will be slow and costly.

What is needed is therefore a simple way to alter the light output from a luminaire, but which can be used as a fixed light output device and does not have to be installed as part of a networked dimmable installation.

SUMMARY OF THE INVENTION

The invention is defined by the claims.

Examples in accordance with a first aspect of the invention provide a lighting control module, comprising:
an interface for receiving a dimming setting;
a memory for storing the dimming setting;
an output circuit for generating a dimming control signal for application to an external dimming interface of a lighting driver circuit based on the dimming setting stored in the memory; and
a power supply circuit for powering the output circuit based on power received from the external dimming interface of the lighting driver circuit.

This module generates a dimming control signal which is applied to a dimmable driver. However, the dimming level may be fixed by the installer during installation so that the normal dimming function is not used after installation. Additional real time functions may however be implemented as discussed below. The dimmable driver does not require installation in a networked system designed for dimming functionality. However, the module may also be used in a networked dimmable architecture.

This lighting control module may be applied to a luminaire design to tune it to a desired output current. This enables fewer luminaire designs to be needed, and therefore a reduction in the total stock that wholesalers need to keep in order to serve their customers. It allows installers to quickly adapt the lighting design if it turns out that the lighting design in the field is not quite satisfactory.

The lighting control module is for communicating with a dimmable driver, but this may be a simple dimmable driver (using a legacy dimming interface). The module is an add-on component which can set the dimming interface to a permanent level that effectively limits the output of the luminaire to the dimming setting that is required.

Preferably, the dimming setting is able to be set without powering the lighting driver or the module. When the driver is powered, it provides power to the control module over the dimming interface. Again, the control module does not need its own power supply, and it does not need any connection to internal parts of the driver. It simply connects to the external dimming interface of the driver.

For example, the interface to the lighting control module may be a wireless interface for receiving a wireless dimming setting signal, wherein the control module comprises an NFC antenna, an NFC receiver, and a power harvesting circuit for harvesting power from the wireless interface to enable the memory to store the dimming setting. The module can thus receive instructions from a wireless configuration device, which is used both to supply the desired dimming setting and also provide the power to enable the dimming setting to be stored in memory within the module. This communication can in preferred examples be made with no power to the module. The module does not even need to be connected to the driver at this stage.

The dimming setting can thus be made in a short time using a wireless device which communicates with the module, by unskilled personnel using simple tools. The selection of the dimming setting may be made before installation of the luminaires or in the field during installation.

The module preferably comprises a physical output connector for connection to the lighting driver circuit. The module is left in place as part of the luminaire, and it can simply be plugged or wired to the dimming interface as part of the installation procedure.

The dimming setting may be for setting a dimming level as mentioned above. In this way, a luminaire is tuned to a desired light output.

In another example, the dimming setting is for processing an externally input dimming setting to define a maximum brightness level to be allowed. This enables a luminaire to be used within a networked dimmable system. Instead of the module setting a dimming level, it may then be used to impose a set of rules concerning allowed dimming. For example, by setting a maximum brightness, dimming may be allowed only to below that maximum brightness.

In another example, the dimming setting is for processing an externally input dimming setting to rescale the dimming function. In this way, different luminaires can be made to respond differently to a global dimming command.

The control module may be adapted to alter the dimming control level as a function of the ambient light level. In this way, the dimming level applied by the module may additionally implement daylight adaptation functions based on an integrated light sensor.

The dimming control signal may comprise a DALI signal. The memory of the control module may then be adapted to store other DALI settings.

In another example, the dimming control signal comprises a 1-10V signal.

The invention also provides a lighting system comprising:
a lighting control module as defined above; and
the lighting driver circuit, which lighting driver circuit has the dimming interface to which the dimming control signal is applied.

The dimming interface may be a 1-10V dimming interface able to receive a standard 1-10V dimming signal. In this case, the dimming control signal of the lighting control module may have a first range of voltage values with a lowest value greater than 1V. This lowest value may result from the need to draw sufficient power from the dimming interface in order to power the module. For example, the 1-10V interface may function as a current source, for example of 150 μA. To generate enough power to operate the module, a voltage greater than 1V may be needed, such as 1.8V or even higher, such as 4V. This problem arises because the dimming control signal is applied to the same physical line as the line from which power is drawn.

The lighting driver may then comprise a rescaling unit for rescaling the dimming control signal to form a 1-10V signal.

In this way, even if the control module is not able to generate the full range of 1-10V signals, a rescaling may be made so that the full range of the 1-10V dimming interface of the lighting driver may be used. The rescaling unit may comprise a wireless interface for receiving a rescaling command. This rescaling command may then be generated by the same configuration unit which communicates with the control module.

The system may further comprise a configuration device for sending the dimming setting wirelessly to the lighting control module. This is the module used by the installer to set the luminaires to their desired settings.

The invention also provides a method of setting a dimming level of a lighting system which comprises a lighting driver with a dimming interface, the method comprising:
connecting a lighting control module to the dimming interface;
sending a dimming setting from a configuration device to the lighting control module;
storing the dimming setting in the lighting control module;
using power provided by lighting driver to the dimming interface, powering the lighting control module and reading the stored dimming setting; and
within the lighting driver, setting the dimming level based on the stored dimming setting.

This method enables a lighting control module to be programmed in a simple manner. Only when connected to the driver is the programmed setting then used to control the lighting driver. Note that the lighting module may be connected to the dimming interface before or after the dimming setting is sent to and stored in the lighting control module.

Storing a dimming setting in the lighting control module may use power harvested from a wireless communication of the dimming setting to the lighting control module.

The dimming setting may be used for:
setting a dimming level; or
processing an externally input dimming setting to define a maximum dimming level to be allowed; or
processing an externally input dimming setting to rescale the dimming function.

In the lighting driver, the dimming setting read from the lighting control module may be rescaled to form a 1-10V dimming control signal.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting control module which comprises an interface for receiving a dimming setting and a memory for storing the dimming setting. Based on the dimming setting, an output circuit generates a dimming control signal for application to a conventional dimming interface of a lighting driver circuit. For this purpose, power is received from the dimming interface. This provides a simple to use way to implement a controllable brightness, which makes use of a dimming driver but used for a luminaire which does not need to be within a networked dimmable system architecture.

The dimming setting may be a wireless signal, and a power harvesting circuit may be provided for harvesting power from the wireless interface to enable the memory to store the dimming setting.

A customer using modules to build luminaires may desire to optimize their luminaire light output to their preferences, without being limited to a fixed light output, temperature or power. For instance, their own optical design may require less light output from the module. Alternatively, due to the use of a miniaturized heat sink, a reduced power may be desired to prevent the module reaching too high temperatures.

The desire for the customer to be able to flexibly set the output current has been recognized. For example, a setting resistor may be inserted into the driver by the customer. The driver then uses this setting resistor to define the output current.

An alternative to placing a current setting resistor in a driver is to enable a remotely settable drive current. For example, by using near field communication (NFC) a driver can be programmed using a NFC reader. Philips (Trade Mark) is releasing a system which operates in this way, named the "SimpleSet" (Trade Mark) range. This wireless programming technology allows the luminaire manufacturers to quickly and easily program the LED driver at any stage during the manufacturing process, without a connection to mains power, offering great flexibility.

With this "SimpleSet" system, the driver current is set via the driver and no additional components in the module are required. This approach is thus based on a new and upgraded driver design, and it is therefore particularly suitable for new lighting installations.

There are many existing driver types (fixed output, 1-10V dimming, DALI dimming, different power levels etc.). It would be desirable in existing installations to be able to use existing drivers to implement a simplified light output control.

The invention is based on the use of an existing dimming interface to implement a dimming setting, but without using the wired infrastructure normally associated with the dimming interface.

Figure 1A:
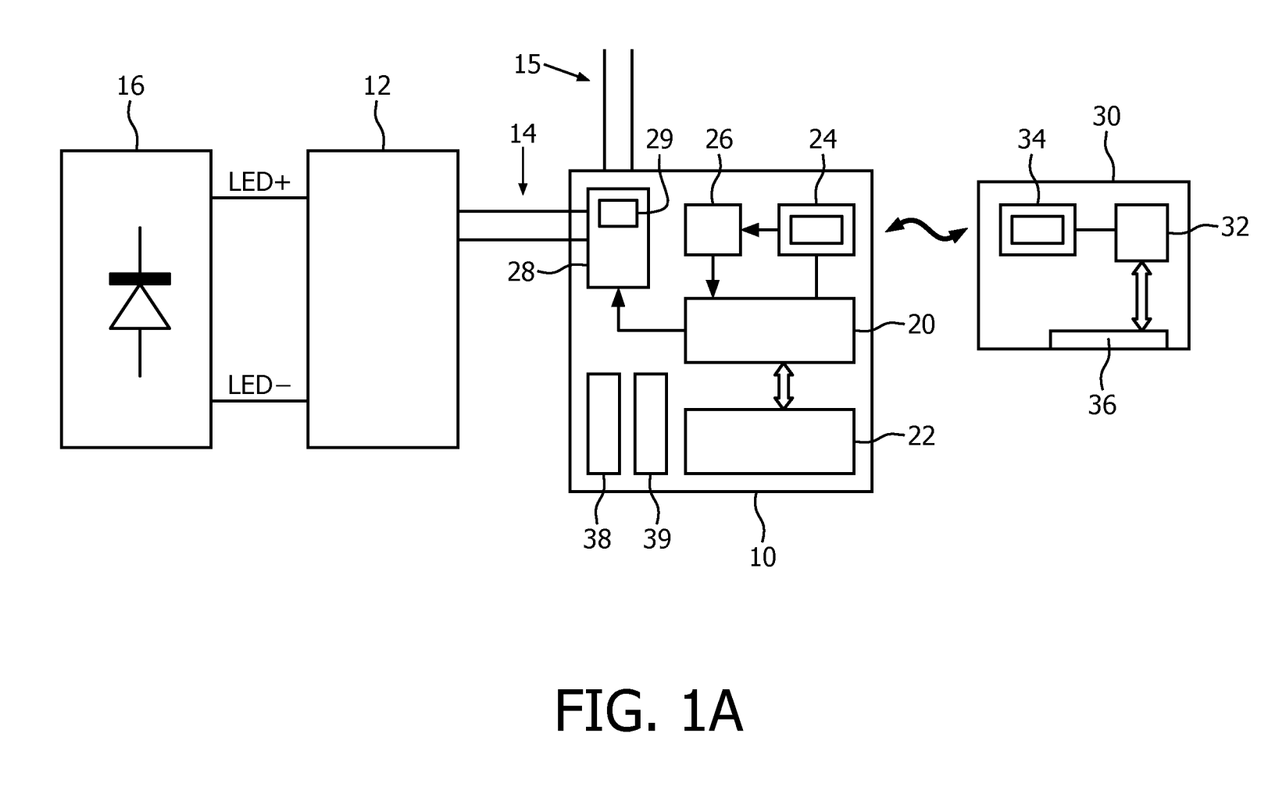
FIG. 1A shows a first example of lighting control module, driver and solid state light source, together with an external interface device.

FIG. 1A shows a first example of a lighting control module 10 coupled to a lighting driver 12, with the coupling comprising a standard dimming interface 14. The driver may for example comprise terminals LED+ and LED− for the lighting module 16 (i.e. an LED string), and a separate pair of wires forming the dimming interface 14.

In the example of FIG. 1A, the driver 12 may be entirely conventional. It has a power unit for providing power to the lighting module 16, a controller for controlling the power applied to the lighting module by the power unit in dependence on the command received over the dimming interface.

This provides a regulation of the power supply delivered to the lighting module.

These elements are standard parts of a conventional driver, and for this reason they are not shown in FIG. 1A. Indeed, the module 10 of this example of the invention is intended to be connectable to a conventional driver.

The lighting module 10 comprises a controller in the form of a microprocessor 20 which includes a near field communication integrated circuit (IC), in particular an NFC reader, which translates NFC commands into a signal for application to the dimming interface 14. The microprocessor has an associated memory 22 and there is an NFC antenna 24. The microprocessor also includes a power harvesting circuit 26 which is able to extract power from the wireless communication to the module 10 for use in powering the microprocessor 20 and memory 22. Such self-powered near field communication systems, such as inductively powered RFID readers, are well known to those skilled in the art.

Figure 1B:
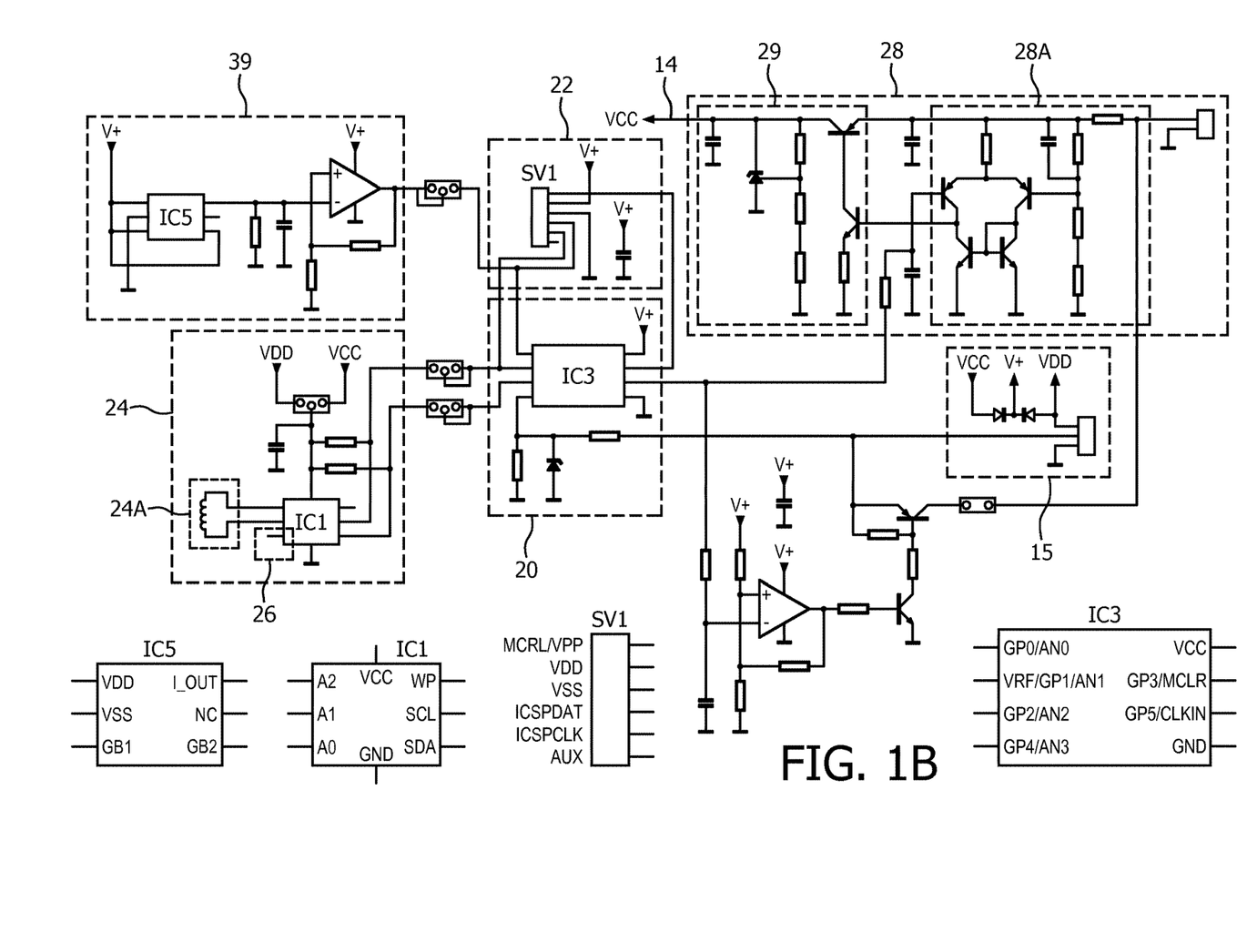
FIG. 1B shows an exemplary schematic circuit diagram of the lighting control module of FIG. 1A.

By way of example, FIG. 1B shows a schematic circuit diagram of the module 10 of FIG. 1A.

The microprocessor 20 in this example is a PIC12F1840 8-bit PIC® Microcontroller. However, it will be appreciated that other embodiments may employ any kind of intelligent device.

The microprocessor 20 functions as a control interface for receiving configuration information from an external configuration device. The external configuration device provides configuration information in the form of a dimming setting which is received by the microprocessor 20. As shown in FIG. 1A, the external configuration device 30 comprises an NFC IC 32, in particular an NFC transmitter, and an antenna 34. A user interface 36 enables a user to select a desired output flux which is translated into a corresponding dimming setting.

Turning back to FIG. 1B, the ADC channel 0 and 1 input pins of the microprocessor are connected to the data and clock pins of an associated memory 22, respectively. The Master Clear pin of the microprocessor is connected to the Master Clear pin of the memory 22.

An NFC antenna 24 circuit, which in this example is a M24LR04E dynamic NFC/RFID tag integrated circuit with dual-interface, is connected to the ADC channel 1 and 2 input pins of the microprocessor 20. More specifically, the serial clock SCL and serial data SDA pins of the NFC integrated circuit are connected to the ADC channel 1 and 2 input pins of the microprocessor 20, respectively. An antenna coil 24A is connected to the antenna coil AC0 and AC1 inputs of the NFC integrated circuit. The NFC integrated circuit also includes a power harvesting circuit 26 which is able to extract power from the wireless communication for use in powering the microprocessor 20 and memory 22. The energy harvesting analog output pin A0 is used to deliver the analog voltage Vout available when the energy harvesting mode of the NFC integrated circuit is enabled and the RF field strength is sufficient.

The control interface (i.e. the NFC receiver of the microprocessor 20) is adapted to receive the dimming setting from the external configuration device 30 before the module is driven by the connected driver or during operation so that changes are allowed during operation and are adapted right away. This can be carried out by a customer before the lighting system is installed. The NFC communication can be used to relay the desired light output to the microprocessor 20 using wireless power transfer from the external configuration device 30, with no other power provided to the module. This may simply involve storing a value in the memory 22. Only when the driver is powered, does the lighting module 10 need to provide a signal to the dimming interface 14.

The lighting control module may enable external dimming commands to be provided over the interface 15. It can either act in pass through mode for those commands or it may be programmed to adapt them in ways described below.

The lighting control module may include a temperature sensor 38 and/or an ambient light sensor 39 for additional functionality, described below. In the exemplary circuit of FIG. 1B, a light sensor circuit 39 is depicted and connected to the data pin of the memory 22 (along with the ADC channel 0 input pin of the microprocessor). Here, the light sensor circuit employs a NOA1212 low power ambient light sensor with an analog current output. The output of the NOA1212 ambient light sensor is fed to the memory via an amplifier (with feedback).

An output circuit 28 is used for generating a dimming control signal for application to the dimming interface of the lighting driver 12 circuit based on a dimming setting stored in the memory 22. The output circuit essentially functions as a resistive divider. The RA5 (pin2) of the microprocessor is connected to an input stage 28A of the output circuit. In the example circuit of FIG. 1B, the input stage 28A comprises a (Long Tailed) pair of transistors with current fed via a common resistor at the emitters. The RA5 (pin2) of the microprocessor is connected to the non-inverting (+) input as the input signal of the input stage. The inverting (−) input (dealing with feedback) is provided at the resistive divider.

A power supply circuit 29 is used for powering the output circuit 28 using power received from the dimming interface 14.

Output circuit/module 28 has a double function, on one hand it has to create a low voltage supply for the electronics by means of supply circuit 29. The analogue input of output module 28 can vary between 0V and 10V according to the signal on RA5 of the microprocessor. The lamp driver generates a voltage of 10V, this voltage is limited in current when the current exceeds the maximum current level the driver can create at this input (typically around 150 uA) the voltage on the analogue interface will drop down. By drawing with the help of input stage 28A just the right amount of current the voltage will drop to the desired level. This voltage level is also monitored in the lamp driver which acts on this by changing its lamp power. If the input stage 28A draws more than 150 uA, and the voltage on the input is also dropping down, the voltage to feed the electronics will drop. In this example, however, the voltage is not permitted to drop lower than e.g. 3V. This means that the output module 28A will never draw more current than that which allows the voltage to drop below 3V. With this 3V, the supply circuit 29 can still provide enough power to supply its own electronics (Vcc).

The module has another dimming interface 15 so that even with the module connected to the driver, the driver may still receive standard dimming commands over a conventional interface.

A first implementation will be described in more detail based on a using a legacy 1-10V analog dimming interface to set the appropriate light level of the luminaire.

The lighting control module 10 can be powered by using the small current that is generated by the 1-10V dimmable driver, e.g. 150 µA, which means that the module does not need its own power supply and can remain compact and cheap. Such a module also allows for a number of other functions, like storage of the actual time that the fixture was used, the number of times that the fixture was switched, etc. The use of an NFC protocol makes it possible to set and read these settings and data even without the power applied to the luminaire.

The value of the NFC memory setting is read out using a simple low power microprocessor 20.

In a first implementation, the value from this memory 22 is used to set the voltage level of the 1-10V output to the appropriate dimming level.

Figure 2:
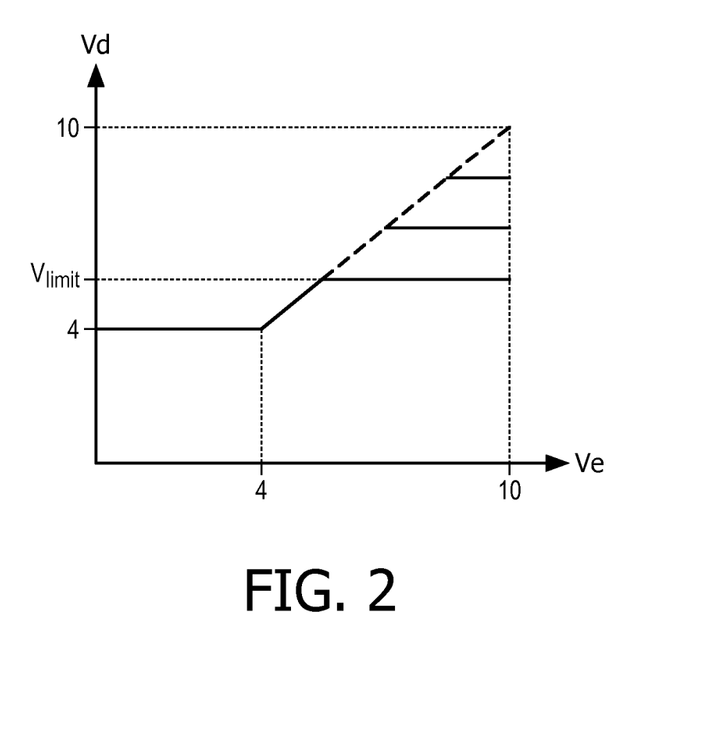
FIG. 2 shows an example of a function which may be implemented by the lighting control module of FIG. 1.

FIG. 2 shows an alternative approach in which the dimming setting provided to the module 10 is used to limit a 1-10V input signal to a maximum setting based on the value in the memory location.

In this way, the luminaire may be part of a dimmable installation, but the range of output brightness levels is limited by the configuration. Thus, the use of the module does not prevent the dimming interface being used for receiving standard dimming signals within a dimmable architecture.

The various plots in FIG. 2 show different transformations which may be applied to the dimming curve, plotting the output voltage Vd provided to the standard dimming interface of the driver (y-axis) against the external input Ve (x-axis). The maximum brightness is limited by limiting the output voltage Vd. For the transfer curve shown in bold, the voltage is limited to $V_{limit}$, so that accordingly the light output is limited. The dashed curves show other possible transfer functions, where the highest level of the output brightness is limited to different levels. A high brightness corresponds to a high dimming value e.g. 10V, whereas a low brightness, i.e. deep dimming, corresponds to a low dimming value, e.g. 1V.

Figure 3:
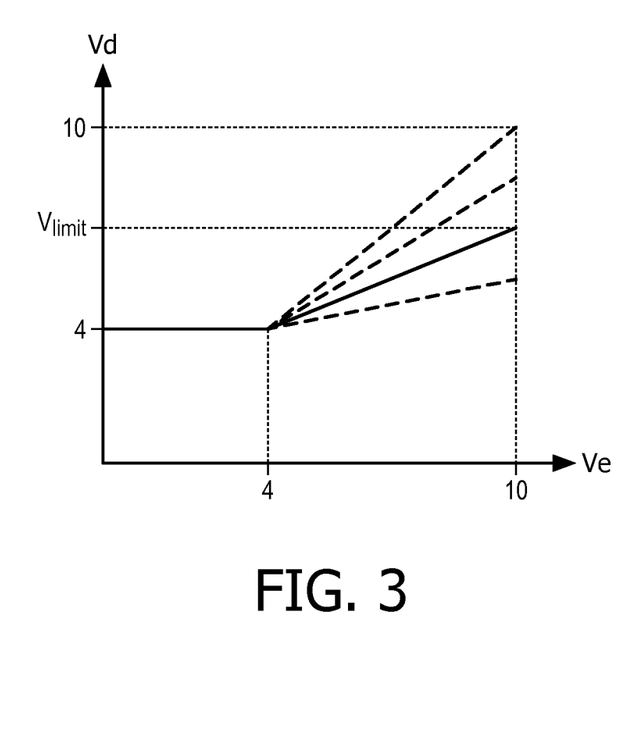
FIG. 3 shows another example of a function which may be implemented by the lighting control module of FIG. 1.

Another approach is shown in FIG. 3, in which the dimming curve is rescaled so that the maximum output is again limited, but rather than providing a capping function as in FIG. 2, the full range of voltages to the external input Ve which can be processed (from 4V to 10V in this example) is rescaled to a range from 4V to the limit value $V_{limit}$. The various plots in FIG. 3 again show different transformations which may be applied to the dimming curve, plotting the output voltage Vd provided to the standard dimming interface of the driver (y-axis) against the external input Ve (x-axis). For the transfer curve shown in bold, the voltage is limited to $V_{limit}$, but this corresponds to a 10V external input (rather than a lower input as in FIG. 2). The dashed curves again show other possible transfer functions, where the highest level of the output brightness is limited to different levels.

If no external voltage Ve is provided, the control module will simply set the output brightness level according to the value stored in memory 22. This may be a value that has been programmed in memory, or else it may be a factory default value.

Note that the examples of FIGS. 2 and 3 are based on a control module which requires a 4V supply to function, and in the case of an analogue dimming interface, this sets the minimum voltage that can provided to the dimming interface.

The module may be extended with other useful functions such as daylight adaptation based on an integrated light sensor. If this function is added, the data in the memory 22 of the microprocessor 20 can be used to:

store user-settable calibration data for the daylight adaptation;

enable or disable a daylight adaptation function;

set maximum and minimum dimming levels during a daylight adaptation period;

set the daylight sensor sensitivity to adjust the daylight adaptation range;

set whether the module uses an ad hoc defined or factory-defined calibration settings for the daylight adaptation function or uses an auto-calibration routine;

set the response time of the light adaptation control loop.

The module may also be used to read out information, such as the actual auto-calibration parameters for the daylight sensor, or read out historical dimming level information. Other manufacturer-related information may also be stored for readout, such as the date of production, or information concerning the project where the unit has been used, for easy traceability in case of field complaints.

The module may also enable other parameters to be read out or configured, such as:

the way the light level should ramp up after power-up;

a dimming curve shape of the module 10, for example to correct a dimming transfer function of the driver;

the total operation time of the unit so that the life time of the LED board/driver can be evaluated.

This list is just a small set of examples of additional functionality which may be incorporated.

In order to store or read the different parameters in the NFC chip of the device, several known methods exist, such as dedicated programmers that communicate using NFC. Alternatively a dedicated smartphone application could be made that runs on off-the-shelf smartphones which have an NFC chip on board.

Another set of examples may be based on a dimming interface which uses the DALI standard. The module could again be powered from the DALI input of the lighting driver, if the driver is able to supply power to the interface bus (which is allowed within the DALI 2.0 standard definition).

The microprocessor of the lighting control module may then be programmed such that a mirror image of several DALI memory blocks could be made available for programming and/or readout via the NFC interface. Due to the fact that the DALI interface bus is bidirectional, and dependent on the capabilities of the driver, several additional functions could be implemented, such as:

readout of power metering data of the driver (actual or aggregated over time);

manufacturer related data stored in DALI memory blocks;

other contents of DALI memory blocks (as defined in IEC 62386).

The lighting control module may also include a temperature sensor which may be used for setting a maximum temperature or for controlling the lifetime of the module. The dimming level may be adjusted in dependence on the temperature level. This may be used to program the module to stay below a maximum temperature, which may for example enable implementation of a guaranteed lifetime.

Figure 4:
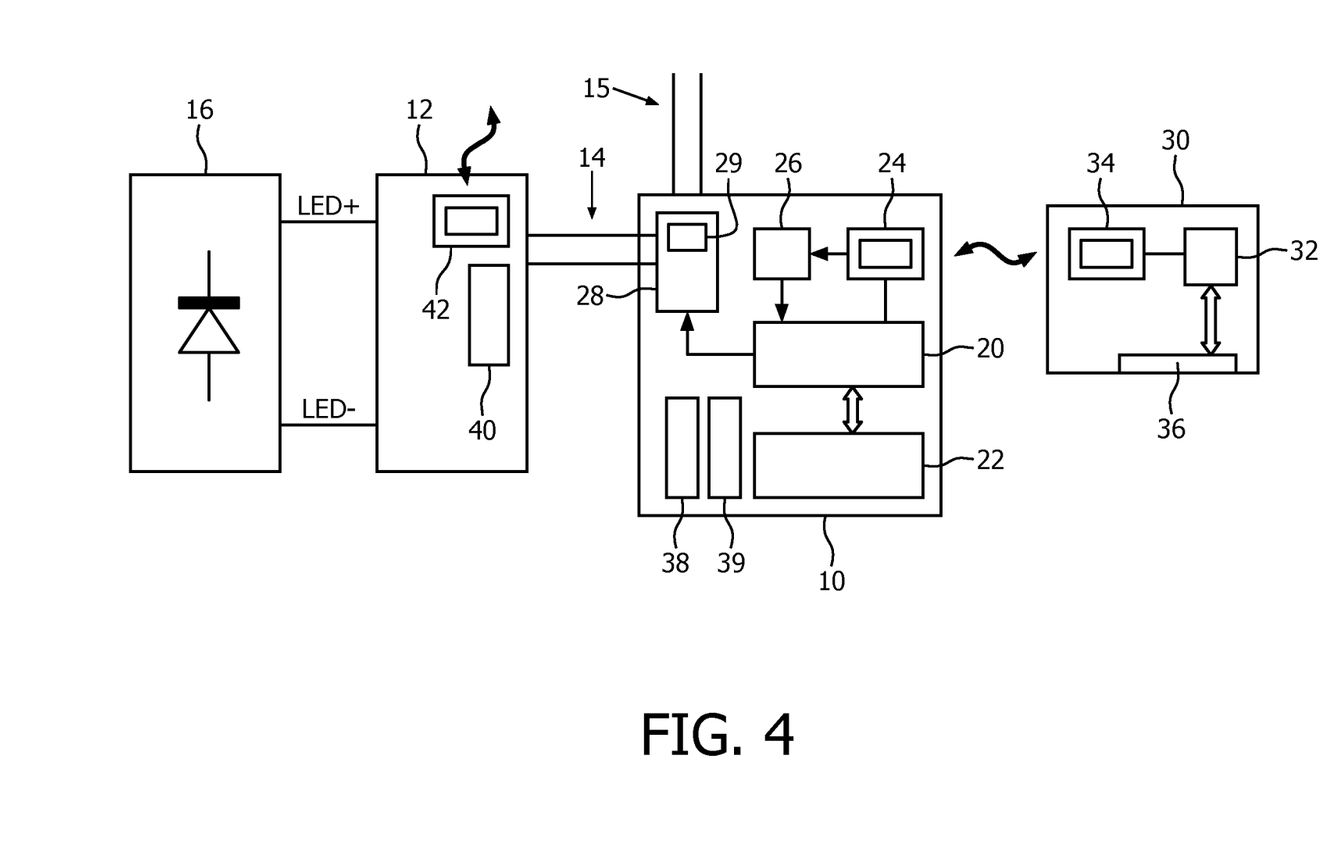
FIG. 4 shows a second example of lighting control module, driver and solid state light source, together with an external interface device.

FIG. 4 shows a modification to the system of FIG. 1. In this case, there is an additional rescaling unit 40 in the driver 12 and it has an NFC communication interface as shown by antenna 42. The wireless communication is also with the configuration device 30. This arrangement is of particular interest for a driver with a 1-10V dimming interface.

The input 14 to the driver 12 is able to receive a standard 1-10V interface, in which case the unit 40 acts in pass through mode, or else it can receive a differently scaled dimming curve from the module 10, and the unit 40 then performs a rescaling function.

As mentioned above, the lighting control module may be used to implement daylight adaptation functions. In some countries new regulations and standards prescribe that window facing luminaires must dim down if sufficient daylight is available. The requirements can be fulfilled for standalone (non-networked) lighting systems if the light output can be reduced to a maximum of 35% of the original full output of the luminaire.

In the case of a 1-10V dimming interface, there is only a small amount of power provided via the interface. The voltage provided over the interface should not then drop below the typical operating voltage of the microprocessor. This is a problem because the same voltage line of the 1-10V interface is used to derive the power for the module as is used to signal the dimming level to the driver. This may for example limit the lowest possible output voltage to a microcontroller operation voltage which is typically in the range 1.8V to 3V.

However, the dimmable LED luminaire is then no longer dimmable from 10-100%. To enable this full range of dimming for a daylight adaptation system, which may be required by regulations, the lighting control module would have to be able to function powered by a 1V supply voltage. Based on the maximum current of around 150 µA, this makes it difficult to design a working circuit based on the low available power.

This problem may be resolved by re-defining the dimming curve for example such that the 10% level is reached at a voltage around 2-4V and the maximum light output at a dimming voltage level of 8-10V.

Using a redefined dimming curve in the driver would require an LED driver that no longer complies the normal analogue interface standard, which is not desirable. The system of FIG. 4 instead provides a translation between two interfaces. The rescaling unit 40 converts an input form the module (which outputs for example 4V-10V) into a 1-10V interface signal. The rescaling unit 40 can override the normal dimming interface, enabling a proper operation with the lighting control module. The LED driver is still able to function as a 1-10V compliant dimmable driver if the default interface setting that is stored in the rescaling unit 40 is compliant with the standard. Thus, the driver also can receive a conventional 1-10V dimming input at the same input 14 or else a separate standard 1-10V interface may be provided in addition to an interface for the module 10.

The lighting control module 10 uses an adapted dimming curve, enabling a sufficiently high voltage at all dimming settings.

When sold in combination with a smart daylight sensor within the control module 10 as described above, the dimming curves of both driver and lighting control module (which then functions as a sensor box) can then be adapted using a NFC tool in the form of either a dedicated NFC configuration device 30 or a smartphone and application that supports NFC.

The driver 12 has a standard 1-10V dimming behavior with a minimum arc power at 1V, a maximum arc power at 10V, a rising arc power between 1V and 10V.

The LED ballast within the luminaire leaves the factory with a pre-programmed dim level behavior e.g. a minimum dim level such as 10% for compliance with the 1-10V analogue dimming standard.

Figure 5:
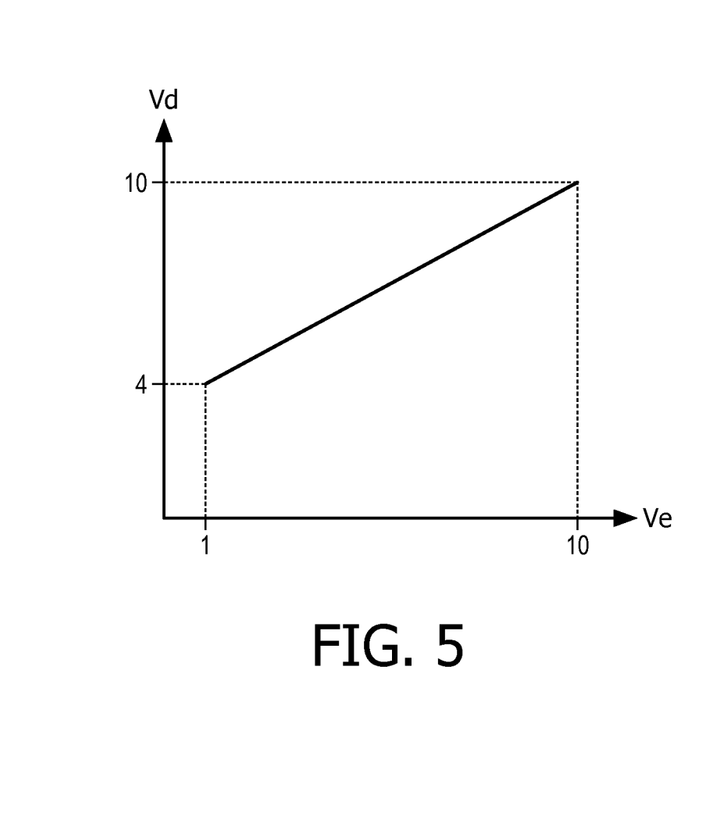
FIG. 5 shows an example of a function which may be implemented by the lighting control module of FIG. 4.

FIG. 5 shows the voltage transformation carried out by the lighting control module. It shows the voltage Vd provided to the driver on the y-axis, which is in the range 4 to 10V. The input to the lighting control module (i.e. the external voltage Ve provided to the lighting control module) may be a standard 1-10V input as shown on the x-axis.

The lighting control module can only lower its output voltage Vd to a voltage not lower than its own operating voltage of e.g. 4V in this example. The lowest voltage may be below 4V, for example 3V or 1.8V.

By changing the dimming curve using the unit 40, which may be set by means of NFC communication as explained above, the dimming behavior is altered in such a way that the minimum light level is achieved based on the operating voltage of the microprocessor of e.g. 1.8V.

Figure 6:
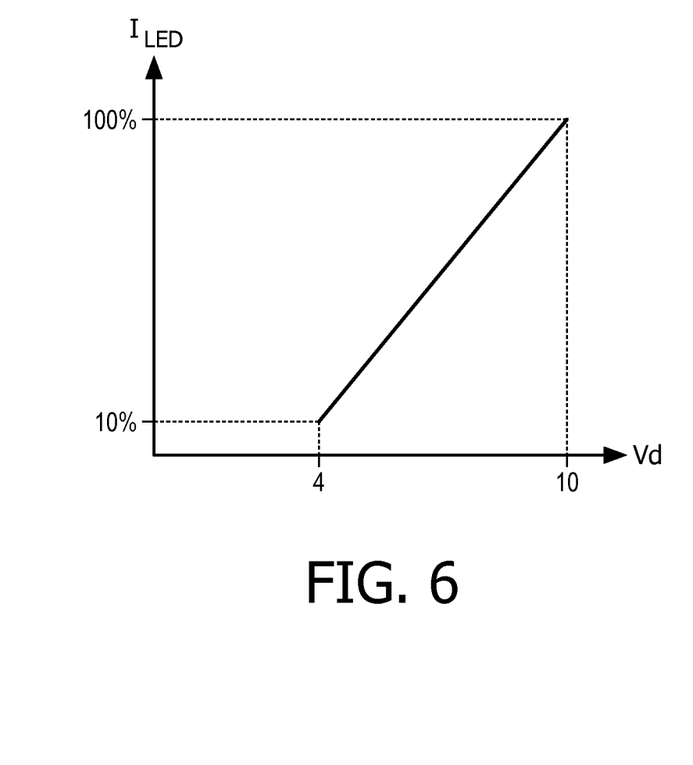
FIG. 6 shows an example of a function which may be implemented by the rescaling unit of FIG. 4.

FIG. 6 shows the function of the unit 40, and shows the conversion from the output Vd provided to the driver, corresponding to the y-axis of FIG. 5, and the LED current $I_{LED}$ which is then applied.

In this way, the dim curve of the ballast is matched to the output voltage of the control module, in this case 4V to 10V. A dimming level may be applied to the memory of the lighting control module, and this can be used to set the dimming level to any value in the normal 10% to 100% range, even though the lighting control module is only able to output a lowest voltage above the 1V lowest level of the 1-10V dimming interface.

The invention may be is used in a variety of lighting applications. The lighting modules may be indoor point sources, down lighting units or spot lighting units. The invention can also be used in linear LED applications (as used in offices), and also outdoor lighting for road and streets. In down lighting and office systems, often a well-defined flux is needed, so that an easy to implement light output setting system is highly desirable. The invention may be used in intelligent lighting systems in open-plan offices, meeting rooms, conference rooms, class rooms, hotel rooms and other hospitality applications, and various other indoor applications.

The invention has been described in connection with an LED lighting arrangement. However, it can be applied to a driver arrangement for other types of lighting technology. For example, other solid state lighting technologies may be used.

The examples above are based on wireless communication with the control module 10. This is preferred as it allows simple operation and also allows two way communication. However, an even simpler implementation is possible in which the there is a manual input to the control module to input a dimming setting, for example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting control module, comprising:
   an interface for receiving a dimming setting;
   a memory for storing the dimming setting;
   an output circuit for generating a dimming control signal for application to an external dimming interface of a lighting driver circuit based on the dimming setting stored in the memory and a measured ambient light level; and
   a power supply circuit for powering the output circuit based on power received from the external dimming interface of the lighting driver circuit, wherein the dimming setting is for processing an externally input dimming setting to rescale a dimming function in response to said measured ambient light level requiring a voltage input to said lighting driver circuit that is below a minimum voltage, of said dimming control signal, producible by said output circuit.

2. The lighting control module as claimed in claim 1, wherein the interface is a wireless interface for receiving a wireless dimming setting signal, wherein the control module comprises an NFC antenna, an NFC receiver, and a power harvesting circuit for harvesting power from the wireless interface to enable the memory to store the dimming setting.

3. The lighting control module as claimed in claim 1, comprising a physical output connector for connection to the lighting driver circuit.

4. The lighting control module as claimed in claim 1, wherein the dimming control signal comprises a DALI signal.

5. The lighting control module as claimed in claim 4, wherein the memory is adapted to store other DALI settings.

6. The lighting control module as claimed in claim 1, wherein the dimming control signal comprises a 1-10V signal.

7. The lighting control module as claimed in claim 1, wherein said minimum voltage is 4V.

8. A lighting system comprising:
   the lighting control module as claimed in claim 1; and
   the lighting driver circuit, which lighting driver circuit comprises the dimming interface to which the dimming control signal is applied.

9. The lighting system as claimed in claim 8, wherein the dimming interface is a 1-10V dimming interface able to receive an standard 1-10V dimming signal,
   wherein the dimming control signal of the lighting control module has a first range of voltage values with a lowest value greater than 1V,
   and wherein the lighting driver circuit comprises a rescaling unit for rescaling the dimming control signal to form a 1-10V signal.

10. The lighting system as claimed in claim 9, wherein the rescaling unit comprises a wireless interface for receiving a rescaling command.

11. The lighting system as claimed in claim 8, further comprising a configuration device for sending the dimming setting wirelessly to the lighting control module.

12. The lighting control module as claimed in claim 1, wherein said dimming control signal is rescaled to be below said minimum voltage to produce said input voltage to said lighting driver circuit in response to said measured ambient light level requiring said input voltage to said lighting driver circuit that is below said minimum voltage, of the dimming control signal, producible by the output circuit.

13. A method of setting a dimming level of a lighting system which comprises a lighting driver with a dimming interface, the method comprising:
   connecting a lighting control module to the dimming interface;
   sending a dimming setting from a configuration device to the lighting control module;
   storing the dimming setting in the lighting control module;
   using power provided by the lighting driver to the dimming interface, powering the lighting control module and reading the stored dimming setting; and
   within the lighting driver, setting the dimming level based on the stored dimming setting and a measured ambient light level,
   wherein the dimming setting is used for processing an externally input dimming setting to rescale a dimming function in response to said measured ambient light level requiring a voltage input to said lighting driver that is below a minimum voltage, of a dimming control signal, producible by an output circuit for application to said lighting driver.

14. The method as claimed in claim 13, further comprising, in the lighting driver, rescaling the dimming setting read from the lighting control module to form a 1-10V dimming control signal.

15. The method as claimed in claim 13, wherein said dimming control signal is rescaled to be below said minimum voltage to produce said voltage input to said lighting driver in response to said measured ambient light level requiring said voltage input to said lighting driver that is below said minimum voltage, of the dimming control signal, producible by the output circuit for application to said lighting driver.

\* \* \* \* \*